United States Patent [19]

Beckerman

[11] Patent Number: 4,802,055

[45] Date of Patent: Jan. 31, 1989

[54] TRANSIENT VOLTAGE SURGE SUPPRESSOR

[75] Inventor: Howard L. Beckerman, Middletown, N.J.

[73] Assignee: Joseph L. Brooks Manufacturing Corp., Philadelphia, Pa.

[21] Appl. No.: 112,517

[22] Filed: Oct. 26, 1987

[51] Int. Cl.⁴ .............................................. H02H 9/04
[52] U.S. Cl. ....................................... 361/56; 361/58; 361/111
[58] Field of Search ...................................... 361/54–58, 361/111, 110, 117, 118, 126, 127, 113

[56]  References Cited

U.S. PATENT DOCUMENTS

| 3,546,572 | 12/1970 | Specht et al. | 361/111 |
| 3,793,535 | 2/1974 | Chowdhuri | 307/202 |
| 3,934,175 | 1/1976 | Clark | 317/16 |
| 4,259,705 | 3/1981 | Stifter | 361/113 X |
| 4,563,720 | 1/1986 | Clark | 361/56 |
| 4,584,622 | 4/1986 | Crosby et al. | 361/56 |
| 4,628,394 | 12/1986 | Crosby et al. | 361/56 |
| 4,630,163 | 12/1986 | Cooper et al. | 361/56 |
| 4,698,721 | 10/1987 | Warren | 361/55 X |

Primary Examiner—Philip H. Leung
Assistant Examiner—Todd E. DeBoer
Attorney, Agent, or Firm—David L. Davis

[57] ABSTRACT

A transient voltage surge suppressor including first and second clamping stages with a surge reactor between the stages. The first stage comprises a metal oxide varistor and the second stage comprises a silicon surge suppressor diode. The surge reactor comprises first and second coils wound with the same polarity on a single ferromagnetic core.

8 Claims, 2 Drawing Sheets

TRANSIENT VOLTAGE SURGE SUPPRESSOR

BACKGROUND OF THE INVENTION

This invention relates to an arrangement for protecting sensitive electronic equipment from the effects of transient voltage surges which may appear on AC power lines.

It has long been known that electronic equipment can be damaged, or even destroyed, by transient voltage surges which appear on the AC power lines to which the equipment is connected. These surges can be caused by, for example, a motor turning off. However, the most powerful of these surges are caused by lightning. Studies have shown that lightning can cause voltage spikes of up to 6,000 volts to appear on residential power lines. It is therefore a primary object of this invention to provide an arrangement which will afford protection against such transient occurrences.

To provide such protection, the transient voltage must be clamped to a safe level and the current must be dissipated. Most surge suppression units presently on the market use only a metal oxide varistor (MOV). The MOV clamping voltage must be above the peak of the highest expected line voltage. For nominal 120 volts AC, with a +10% variation tolerance this means that the line voltage could be 132 volts AC. The peak voltage would be this times 1.414, or 186 volts. Allowing for a 20% tolerance variation of the MOV, this brings the MOV rated clamping voltage to 225 volts. A one inch diameter MOV, rated at 70 Joules, can absorb as much as as 6,500 amperes of surge current before being destroyed. However, the high currents, along with the internal resistance of the MOV, allows the clamping voltage level to exceed its rating, which is usually at 10 amperes. Real clamping levels at 3,000 amperes can exceed 400 volts. The 400 volts clamping level is usually enough to damage most electronic equipment.

Another commonly used component is the AC zener diode, which is really a pair of back-to-back zener diodes. This device has the advantage of a 5% tolerance and a lower impedance than the MOV. Accordingly, a lower clamping voltage can be specified without fear of coming too close to the 186 volts line peak. A 195 volts 5% diode is usually specified. However, the current handling capability of the diode is limited to several hundred amperes and a 3,000 amp transient would certainly destroy it. Even so, it does have the advantage of maintaining its clamping voltage throughout its current range.

Another commonly used component is the gas discharge tube. Such a device operates very slowly and ignores fast rise time transients. It also has the disturbing characteristic of remaining shorted until all current has been removed. Thus, it typically turns a transient surge into a total loss of power and a tripped circuit breaker.

Many manufacturers stack different types of clamping components across the power line in the hope that if one type fails to clamp then the other type might take over clamping. Unfortunately, the device with the lowest clamping voltage will conduct all the current while the higher voltage devices will sit idle unless the lower voltage device blows out. In fact, some surge protection units have low amperage fuses to do just that. However, this does not protect equipment which is still connected to a high frequency 400 volts transient.

Still other units are provided with an indicator between clamping stages. Some of these inductors are connected to a capacitor to provide filtering while others act to delay the transient surge between stages.

However, all of the previously known arrangements have not proven to be entirely satisfactory. It is therefore an object of this invention to provide an improved transient voltage surge suppressor which is devoid of the drawbacks of previously known arrangements.

SUMMARY OF THE INVENTION

The foregoing, and additional, objects are attained in accordance with this invention by providing a transient voltage surge suppressor for connection between AC power lines and a load receptacle having a plurality of terminals each corresponding to one of the AC power lines. The inventive suppressor comprises first voltage clamping means connected across the AC power lines for clamping a transient voltage surge appearing on the AC power lines to a first level and second voltage clamping means connected across the receptacle terminals for clamping a transient voltage surge appearing thereacross to a second level, the second level being less than the first level and protective of a load connected to the receptacle terminals. A surge reactor is connected between the first and second voltage clamping means for absorbing and dissipating transient voltage surge energy which is a result of the difference between the first and second levels, the surge reactor including a first coil connected between a first of the AC power lines and a first of the receptacle terminals and a second coil connected between a second of the AC power lines and a second of the receptacle terminals, the first and second coils being wound on a single ferromagnetic core and having the same magnetic polarity on the core.

In accordance with an aspect of this invention, the first voltage clamping means comprises a metal oxide varistor and the second voltage clamping means comprises a silicon surge suppressor diode.

In accordance with another aspect of this invention, the AC power lines includes a hot wire, a neutral wire, and an earth ground wire, the first voltage clamping means includes three metal oxide varistors each connected between a respective pair of the wires, and the second voltage clamping means includes three sets of silicon surge suppressor diodes connected in a wye configuration between the receptacle terminals and a central point.

In accordance with a further aspect of this invention, the central point is electrically floating with respect to the wires and the terminals.

In accordance with yet another aspect of this invention, each set of silicon surge suppressor diodes includes a pair of serially connected silicon surge suppressor diodes.

In accordance with still another aspect of this invention, the suppressor further includes three capacitors each connected across a respective pair of the receptacle terminals, the capacitors cooperating with the surge reactor to provide noise filtering during operation even in the absence of a transient voltage surge.

In accordance with yet a further aspect of this invention, the suppressor further includes a fuse connected in series with the set of silicon surge suppressor diodes connected to the receptacle terminal corresponding to the hot wire.

In accordance with still a further aspect of this invention, the fuse has one end connected to the hot wire corresponding receptacle terminal, the suppressor further including a neon indicator lamp connected between the other end of the fuse and the neutral wire.

BRIEF DESCRIPTION OF THE DRAWINGS

The foregoing will be more readily apparent upon reading the following description in conjunction with the drawings wherein.

DETAILED DESCRIPTION

As contemplated herein, the inventive arrangement is a self-contained unit which is adapted to be plugged into a conventional wall power outlet and have one or more outlets (load receptacles) as its output. Such an arrangement is sometimes referred to as a power strip.

Figure 1:
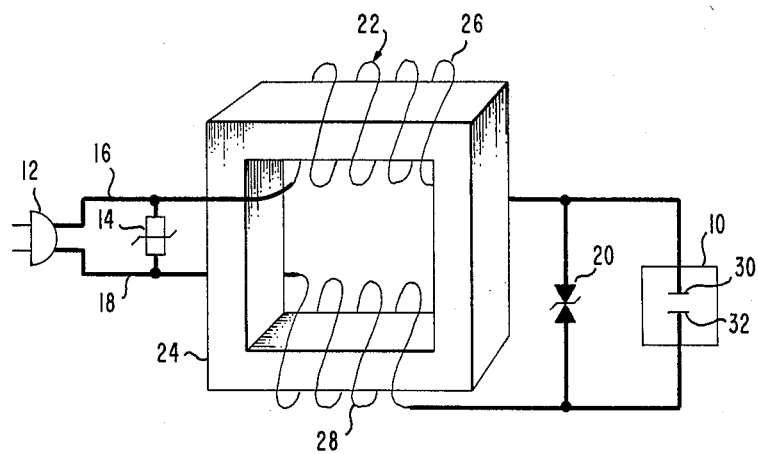
FIG. 1 is a simplified schematic diagram useful in illustrating the principles of this invention as applied to a two wire single phase AC system.

FIG. 1 illustrates such an arrangement for a two wire single phase AC system. This arrangement protects electronic circuitry connected to a receptacle 10 from transient voltage surges which may appear on the AC power lines (not shown) to which the arrangement is connected via the plug 12. The first stage of protective clamping is provided by the metal oxide varistor (MOV) 14 which is connected across the incoming AC lines 16 and 18. Illustratively, the MOV 14 is designed to clamp at 330 volts. The second stage of protective clamping is provided by the silicon surge suppressor (SSS) 20, which is equivalent to a pair of back-to-back zener diodes. The SSS 20 illustratively is designed to clamp at 220 volts. Thus, when a voltage surge appears on the lines 16 and 18, the MOV 14 clamps at 330 volts and the SSS 20 clamps at 220 volts. The 110 volts difference is absorbed by the surge reactor 22, constructed according to this invention.

The surge reactor 22 comprises a ferromagnetic core 24, a first coil 26, and a second coil 28. The coil 26 is connected between the power line 16 and a first receptacle terminal 30. The coil 28 is connected between the power line 18 and the second receptacle terminal 32. The coils 26 and 28 are both wound on the core 24 in such a way that they have the same magnetic polarity on the core—that is if current passes through the coil 26 from left to right and returns through the coil 28 from right to left the magnetic fields set up by the two coils in the core 24 will be additive.

Since the energy of a power line transient can only be changed from one form to another, in accordance with the principles of this invention, this energy is stored in the surge reactor 22 and released over a longer period of time at greatly reduced current levels. Studies have shown that lightning can produce a power line surge of 6000 volts peak and 3000 amperes peak discharge current with a rise time of 8 microseconds. With the arrangement of FIG. 1, the 6000 volts surge is initially clamped by the MOV 14 to approximately 330 volts. The 330 volts 3000 amperes surge then passes through the surge reactor 22 to the 220 volts SSS 20 clamp. The energy stored in the surge reactor 22 is the difference between the two voltages (330−220=110 volts) times the current. The current will depend upon the impedance of the surge reactor 22, which is frequently dependent in a linear manner. Illustratively, the inductances of the coils 26 and 28 is 300 microhenries each. Therefore at a frequency of 60 Hertz, the total impedance of the surge reactor 22 is about 0.1 ohms, almost a direct short. When a surge such as that described above occurs, its 8 microsecond rise time is equivalent to a frequency of 125,000 Hertz, giving the surge reactor 22 an impedance of 236 ohms. The current then would be the voltage (110 volts) divided by the impedance (236 ohms), or ½ amps. If the surge were truly sinusoidal, the current would stay at this low level. However, the surge typically decays to zero after 40 microseconds, and the impedance of the surge reactor 22 will slowly reduce until it eventually returns to the 0.1 ohms level. While the impedance is reducing, the energy which was stored in the surge reactor 22 is drained slowly as heat in both the MOV 14 and the SSS 20. As long as the core 24 does not saturate due to the high flux density induced by the surge, the impedance will oppose any build up of current. To this end, a large, heavy steel laminated core is preferred, capable of handling 6 volt-amperes of continuous power and high surge flux levels.

An important aspect of the use of the surge reactor is that it allows the voltage across the first clamping stage (MOV 14) to be different from the voltage across the second clamping stage (SSS 20). The power line voltage is connected across the MOV 14 which reaches 330 volts during a surge, while the output receptacle is connected to the SSS 20 and is clamped at 220 volts. The surge reactor 22 is what allows this difference to exist, therefore providing real two stage clamping.

The surge reactor 22 must be designed to satisfy two conflicting requirements. It must handle the large voltage across it when a surge is present and it must have a heavy enough wire to handle the normal operating current, usually 15 amperes, without overheating. Thus, to handle high voltage, many turns of wire are necessary, while heavy wire is needed to handle a continuous current of 15 amperes. A practical solution requires a large reactor with a high permeability core and large gauge wire, 12 AWG.

Figure 2:
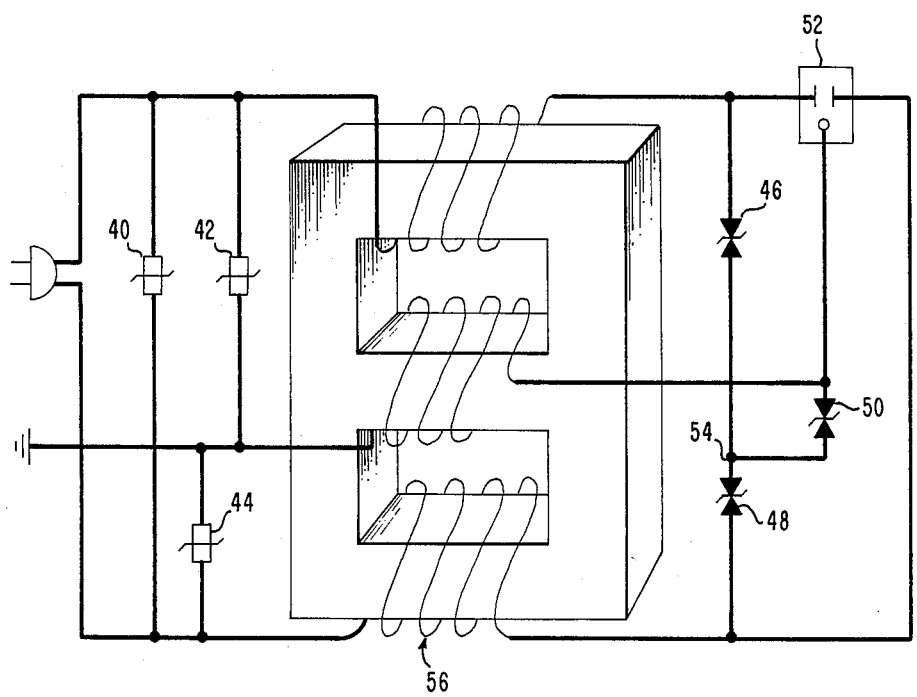
FIG. 2 is a simplified schematic diagram useful in illustrating the principles of this invention as applied to a three wire single phase AC system.

FIG. 2 shows the described design as applied to an arrangement for protecting a single phase three wire system. In this arrangement the three MOV's 40, 42 and 44 forming the first clamping stage are each connected across a respective pair of the incoming AC power lines. The three SSS's 46, 48 and 50 forming the second clamping stage are connected in a wye configuration between the three terminals of the output load receptacle 52 and a central point 54 which is electrically floating with respect to the power line wires and the receptacle terminals. As will be described in more detail hereinafter, the use of a wye configuration for the diodes is advantageous in that it allows the use of lower voltage, higher amperage, diodes. It turns out that there is no advantage in connecting the MOV's in a wye configuration. As in the arrangement of FIG. 1, a surge reactor 56 is connected between the first and second clamping stages.

Figure 3:
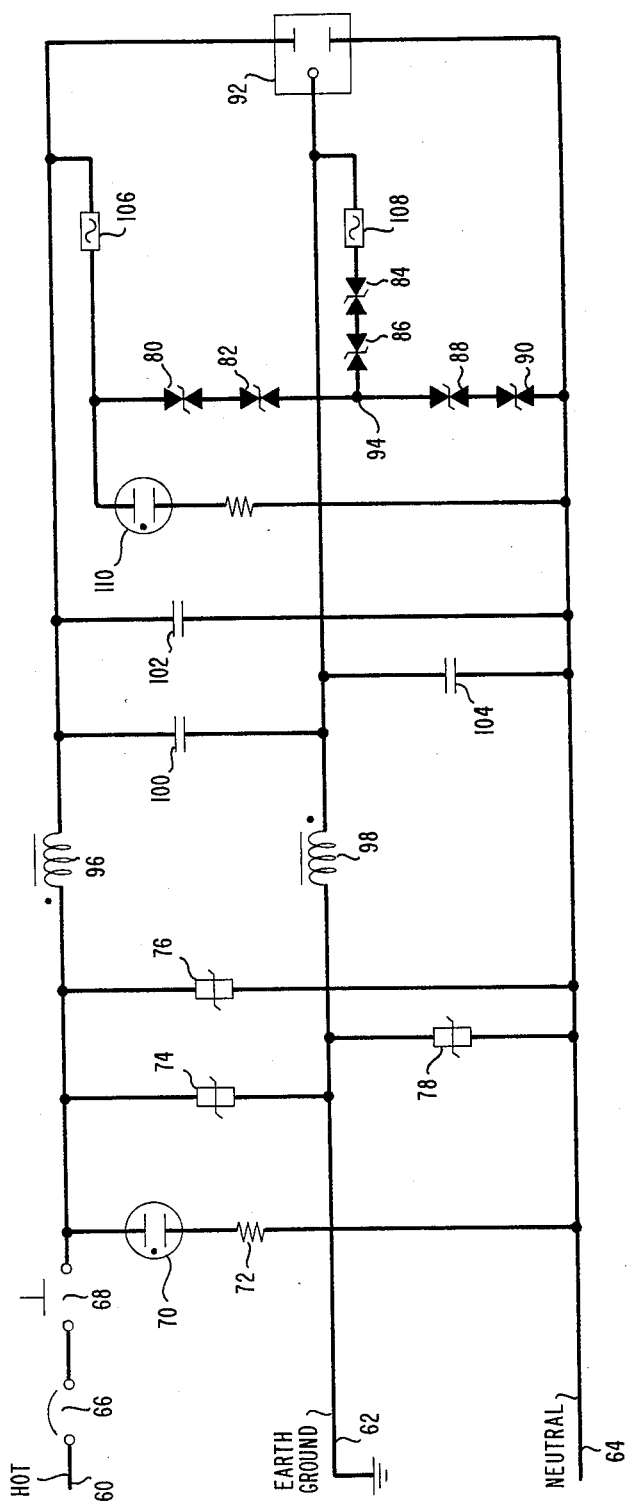
FIG. 3 is a detailed schematic diagram of a preferred embodiment of a circuit incorporating the principles of this invention.

FIG. 3 illustrates a preferred embodiment of an arrangement for a three wire system incorporating the principles of this invention. The incoming AC power lines comprise hot line 60, earth ground 62, and neutral 64. The hot line 60 is connected to the rest of the circuit through a circuit breaker 66 and a switch 68. The neon lamp 70 in series with the resistor 72 provides an indication when power is applied to the system through the circuit breaker 66 and the switch 68. The first stage of clamping is provided by the MOV's 74, 76 and 78 which are connected across respective pairs of the incoming lines in a delta configuration. The second stage of clamping is provided by the silicon surge suppressor diodes 80, 82, 84, 86, 88 and 90, used in pairs and connected in a wye configuration between the terminals of the output load receptacle 92 and a central point 94 which is electrically floating with respect to the power lines and the receptacle terminals.

Between the first and second clamping stages is the surge reactor, which comprises a first winding 96 in the hot line and a second winding 98 in the ground line. Thus, a surge from hot to neutral or from ground to neutral will pass through one reactor winding and a surge from hot to ground will pass through two reactor windings. A lightning surge is more likely to be from hot to ground, where there is more protection. The windings 96 and 98 are wound on a single ferromagnetic core with the same polarity, as illustrated, and as was previously described. During normal operation, current passes through the hot line, so the winding 96 is of heavy gauge wire, 12 or 13 AWG. The winding 98 in the ground line normally does not carry any current, so lighter gauge wire (18 AWG) can be used.

During normal operation, the capacitors 100, 102 and 104 act as noise filters together with the impedance of the windings 96 and 98. The fuses 106 and 108 are used just in case the diodes short out due to an excessive transient. When this occurs, the receptacle 92 is still usable but its surge protection abilities are reduced to only MOV protection. The neon lamp 110 turns off if such an occurrence happens, thereby warning the receptacle user.

The use of the wye configuration for connecting the diodes is very advantageous. This configuration always clamps the surge voltage across two sets of diodes, instead of one. Since silicon surge suppressor diodes having a lower voltage rating always have a higher current rating, the use of the wye configuration allows the use of lower voltage, higher current, diodes with no penalties in size, component count, or cost. It is interesting to note that there is no advantage in connecting the MOV's in a wye configuration. This is because these devices have the same current handling capacity for all voltages.

Accordingly, there has been disclosed an improved arrangement for protecting sensitive electronic equipment from the effects of transient voltage surges which may appear on AC power lines. While this invention has been described with reference to a preferred embodiment, numerous other variations, modifications and adaptations of the present invention will be apparent to those skilled in the art and such as come within the spirit and scope of the appended claims are considered to be embraced by the present invention.

I claim:

1. A transient voltage surge suppressor comprising:
   first connection means for connecting said suppressor to AC power lines;
   second connection means connecting said suppressor to a load receptacle having a plurality of terminals;
   first voltage clamping means connected across said first connection means to clamp a transient voltage surge appearing on said first connection means to a first level;
   second voltage clamping means connected across said second connection means to clamp a transient voltage surge appearing thereacross to a second level, said second level being less than said first level and protective of a load connected to said receptacle terminals; and
   surge reactor means connected between said first and second voltage clamping means to absorb and dissipate a transient voltage surge energy which is a result of the difference between said first and second levels, said surge reactor means including a first coil connected between a first end of said first voltage clamping means and a first end of said first voltage clamping means and a second end of said second voltage clamping means, said first and second coils being wound on a single ferromagnetic core and having the same magnetic polarity on said core.

2. The suppressor according to claim 1 wherein said first voltage clamping means comprises a metal oxide varistor and said second voltage clamping means comprises a silicon surge suppressor diode.

3. The suppressor according to claim 1 wherein:
   said first connection means includes a hot wire, a neutral wire, and an earth ground wire for connecting to a corresponding one of said AC power lines;
   said second connection means includes a plurality of wires each coresponding to one of said receptacle terminals;
   said first voltage clamping means includes three metal oxide varistors each connected between a respective pair of said first connection means wires; and
   said second voltage clamping means includes three sets of silicon surge suppressor diodes connected in a wye configuration between said second connection means wires and a central point.

4. The suppressor according to claim 3 wherein said central point is electrically floating with respect to said first connection means wires and said second connection means wires.

5. The suppressor according to claim 3 wherein each set of silicon surge suppressor diodes includes a pair of serially connected silicon surge suppressor diodes.

6. The suppressor according to claim 3 further including three capacitors each connected across a respective pair of said second connection means wires, said capacitors cooperating with said surge reactor means to provide noise filtering during operation in the absence of a transient voltage surge.

7. The suppressor according to claim 3 further including a fuse connected in series with the set of silicon surge suppressor diodes connected to the second connection means wire corresponding to said first connection means hot wire.

8. The suppressor according to claim 7 wherein said fuse has one end connected to said second connection means hot wire, said suppressor further including a neon indicator lamp connected between the other end of said fuse and the second connection means wire corresponding to said first connection means neutral wire.

* * * * *

UNITED STATES PATENT AND TRADEMARK OFFICE
CERTIFICATE OF CORRECTION

PATENT NO. : 4,802,055

DATED : January 31, 1989

INVENTOR(S) : Howard L. Beckerman

It is certified that error appears in the above-identified patent and that said Letters Patent is hereby corrected as shown below:

Column 6, line 15, after "end", insert -- of said second voltage clamping means and a second coil connected between a second end --

Signed and Sealed this

Thirteenth Day of June, 1989

Attest:

DONALD J. QUIGG

*Attesting Officer*   *Commissioner of Patents and Trademarks*